UNITED STATES PATENT OFFICE.

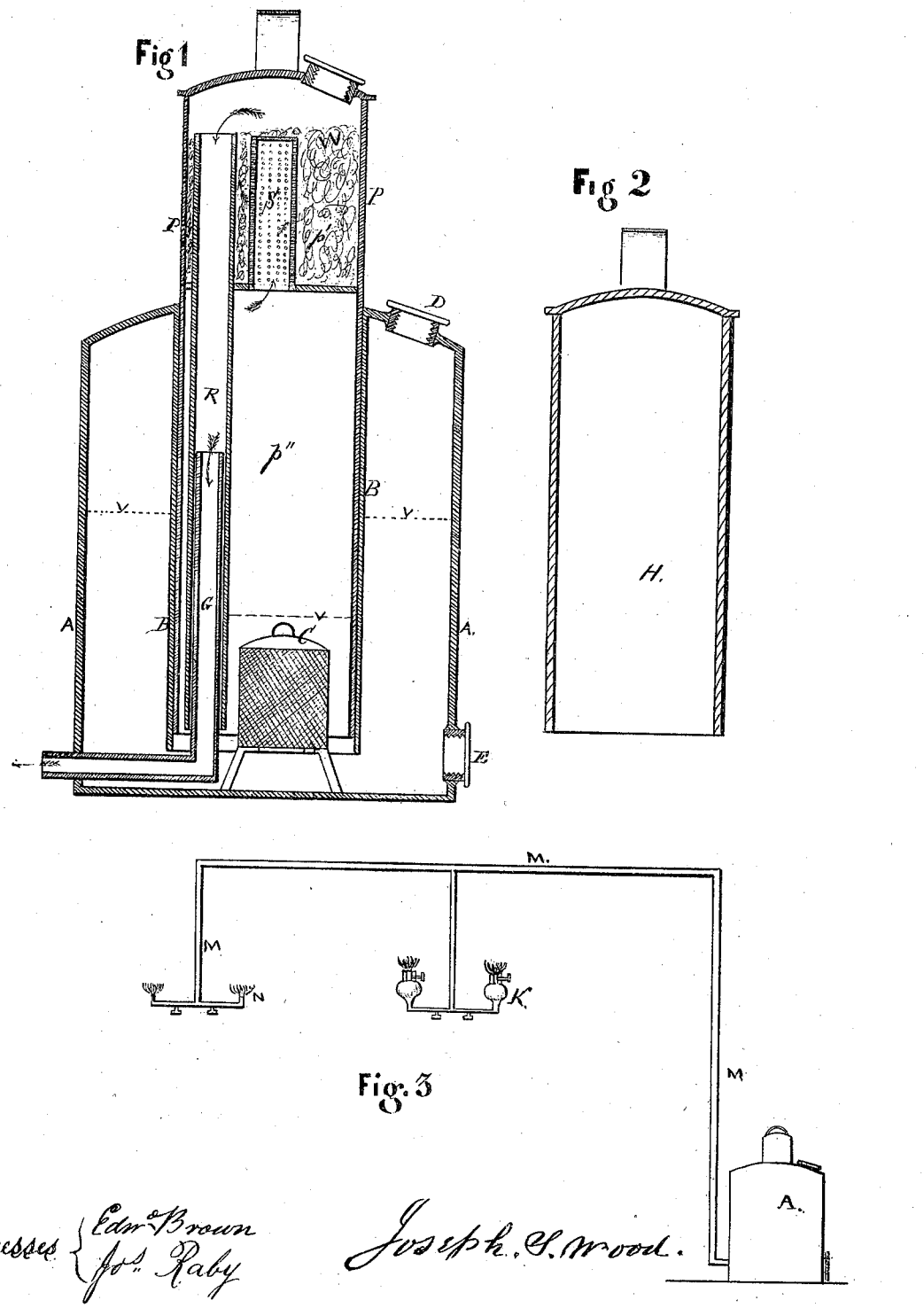

JOSEPH S. WOOD, OF PHILADELPHIA, PENNSYLVANIA, ASSIGNOR TO HIM-SELF AND JOHN J. CARBERRY, OF SAME PLACE.

IMPROVEMENT IN GENERATING HYDROGEN AND HYDROCARBON GAS.

Specification forming part of Letters Patent No. 97,580, dated December 7, 1869.

*To all whom it may concern:*

Be it known that I, JOSEPH S. WOOD, of the city and county of Philadelphia, and State of Pennsylvania, have invented certain Improvements for Making Hydrogen and Hydrocarbon Gas for Illuminating Purposes, of which the following is a specification.

The nature of my invention consists in the construction of a double cylindrical vessel to contain the dilute sulphuric acid, and in the arrangement therein of the telescopic tube which contains the hydrogen gas, which said gas is passed through the pipes of a dwelling and carbureted at the point of combustion. The aforesaid double cylindrical vessel is adapted in its construction to receive a supplementary telescopic tube containing a light hydrocarbon oil. By changing the telescopic tube first mentioned for this one the hydrogen gas is at once converted into hydrocarbon gas suitable for illuminating purposes.

To enable others skilled in the art to make and use my invention, I will now proceed to describe its construction and operation.

Figure 1 is a vertical section through the machine with the carbureting tube inserted. Fig. 2 is a section through the tube which is used for generating hydrogen gas only. Fig. 3 shows the general arrangement of the machine and gas-pipes.

A is the outside cylindrical vessel, having within it an exterior one, B, connected at the top with A, but open at the bottom, so that the liquid dilute sulphuric acid contained therein circulates freely between each vessel.

C is a perforated box containing iron filings.

D is an inlet for filling the reservoir A. The liquid is drawn off at the top E.

G is a tube standing above the level of the acid, open at the top, and at the lower end passing out beneath the interior cylinder, B, to the gas-pipes of a dwelling.

H is a gas-holding telescopic tube, closed at the top and fitting closely within the inner cylinder, B. The hydrogen gas rising within the receiver H passes down the tube G and thence to a carbureting apparatus placed on the burner, as shown at K, Fig. 3.

I need not specify fully the form of carburetor. Saturated cotton wick will answer; or various other well-known plans may be used; but I prefer to use my lamp patented April 27, 1869, in which the atmospheric air forced through the gas-pipes is both heated and carbureted at the burner.

In Fig. 3, A is my machine, from which the hydrogen gas passes through the gas-pipes M and out at the burner through the carbureting-lamp K. When hydrocarbon gas is manufactured the gas passes out of the ordinary burner, as shown at N.

When I wish to manufacture hydrocarbon gas I withdraw the cylindrical reservoir H and insert in its place a similarly-formed reservoir-tube, P. This has a chamber at its upper end, $p'$, separated from the gas-chamber $p''$, and containing lamp-wick, which is saturated by a light hydrocarbon oil, as gasoline.

A tube, R, passes from the top of the chamber $p'$ and fits as a telescopic tube over the tube G, the acid at the bottom forming a dip-seal to prevent the escape of gas.

S is a tubular grating through which the hydrogen passes into the lamp-wick W, and absorbing the carbon passes downward through the tubes R and G through the gas-pipes of a dwelling to the burners.

It will thus be seen that the double cylindrical vessel is adapted in its construction to receive either of the tubes P or H, and can be easily changed from a hydrogen to a carbureting hydrogen-gas machine.

The material put into the basket C and the liquid surrounding it may be changed to suit the various modes of making hydrogen gas.

When too much gas is made the pressure forces the liquid out of the reservoir P into the annular spaces between the cylinders A and B, so that the liquid stands at a different level, as shown at V V, or until the liquid is out of contact with the basket C, so that no more gas is generated.

I do not claim forcing carbureted hydrogen through gas-pipes; but

What I claim as my invention, and desire to secure by Letters Patent, is—

1. The double cylindrical vessel A B for generating hydrogen gas for illuminating purposes, constructed substantially as described.

2. The supplementary telescopic tube P, constructed with the gas-chamber $p''$, carbureting-chamber $p'$, and pipe R, substantially as described.

3. The combination of the double vessel A B, the telescopic tube P, containing the carbureting apparatus, and the tubes R and G, arranged substantially as described.

4. The construction of the vessel A B with the tube G, adapted to receive the reservoir-tube H for making hydrogen gas or the supplementary tube P for making hydrocarbon gas, as herein described.

JOSEPH S. WOOD.

Witnesses:
 EDWD. BROWN,
 JOS. RABY.